M. A. WALDEN.
COVER FOR COOKING VESSELS.
APPLICATION FILED NOV. 22, 1915.

1,193,954.

Patented Aug. 8, 1916.

Inventor,
Marcus A. Walden,
By J. M. Wright
Attorney

UNITED STATES PATENT OFFICE.

MARCUS A. WALDEN, OF SAN FRANCISCO, CALIFORNIA.

COVER FOR COOKING VESSELS.

1,193,954.           Specification of Letters Patent.       Patented Aug. 8, 1916.

Application filed November 22, 1915. Serial No. 62,732.

*To all whom it may concern:*

Be it known that I, MARCUS A. WALDEN, a citizen of the United States, residing at San Francisco, in the county of San Francisco and State of California, have invented new and useful Improvements in Covers for Cooking Vessels, of which the following is a specification.

The object of the present invention is to provide a cover for cooking vessels which will be of simple and economical construction and will prevent burning of the hands when attending to the various operations of cooking as in adding water to the contents or pouring it therefrom, by which, without removing the cover, the condition of the contents of the vessel can be readily ascertained, easily stirred, or cooled or cooked quickly or slowly as desired, which will prevent the contents of the vessel boiling over and thus cracking a hot stove, and which is easily separable into its different parts for packing, shipping or cleaning.

Figure 1:
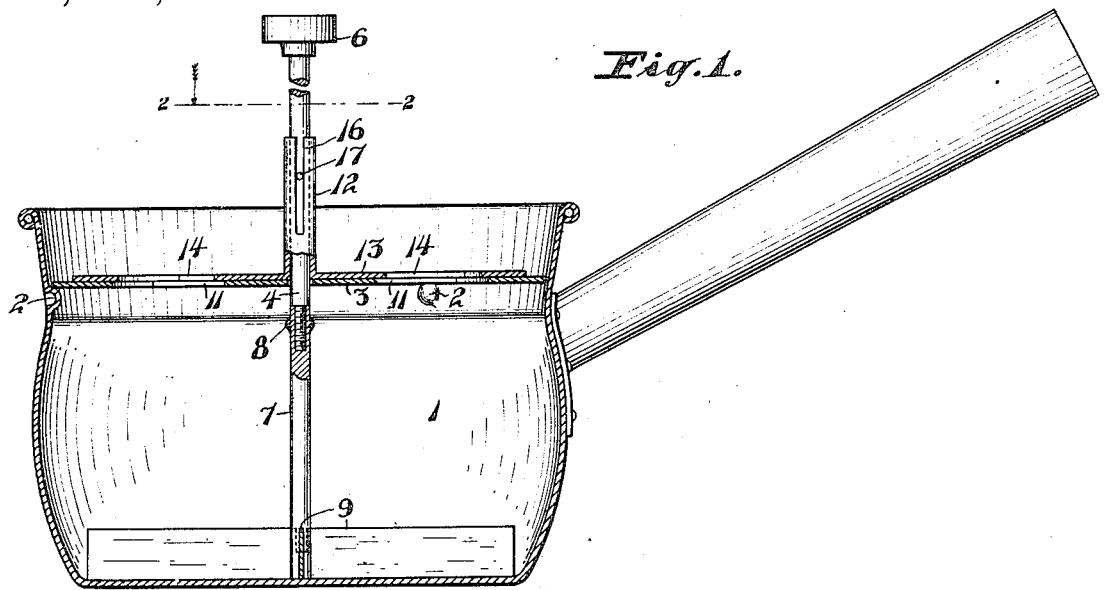
Figure 2:
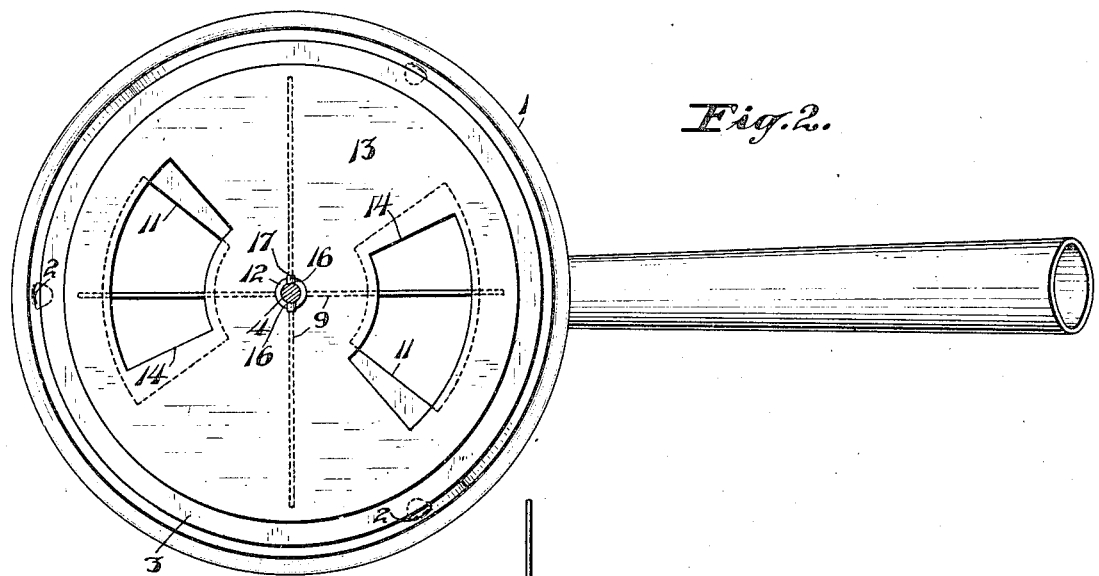
Figure 3:
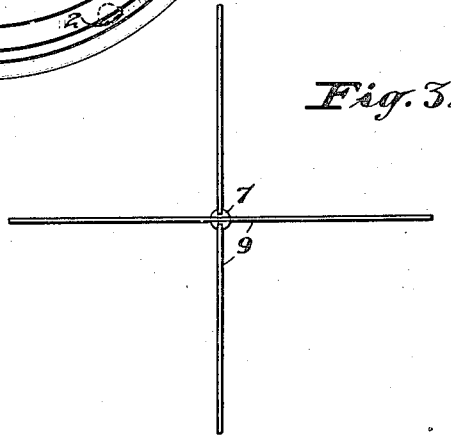

In the accompanying drawing, Figure 1 is a broken vertical sectional view of my improved top and stirrer in position in a cooking vessel; Fig. 2 is a horizontal sectional view thereof on the line 2—2 of Fig. 1; Fig. 3 is a bottom plan view of the stirrer.

Referring to the drawing, 1 indicates a cooking vessel, preferably formed about one inch from the top with three indentations 2, upon which the main portion or plate 3 of the cover can rest. Said main portion has a central hole through which extends loosely a vertical cylindrical sectional stem, comprising an upper section 4, to the top of which is secured a heat insulating knob 6, and a lower section 7, formed at the top with a threaded socket into which is screwed the threaded lower end of the upper section. Said lower section is, at a suitable height, pressed out of a cylindrical form to form a support 8 for the main portion 3 of the cover, when said main portion is raised from the indentations 2 in the sides of the vessel. To the lower end of the lower stem section are secured four stirring arms 9 extending at right angles with one another. The main portion 3 of the cover is formed with two diametrically opposite holes 11 having radially extending sides.

Surrounding the upper section of the stem is a tube 12 to the lower end of which is secured a disk or plate 13 having holes 14 corresponding in shape and size with the holes 11 in the main portion 3 of the cover. Said tube is formed with two diametrically opposite vertically extending open-ended slots 16 through which extends a pin 17 driven transversely into the stem section 4. By this arrangement the cover can be used with vessels of different depths.

With this construction the same knob can be used to turn the stirring arms and also to turn the upper plate with reference to the lower so as to open or close the holes in the lower plate. By means of these holes heat may be permitted to escape from the interior of the vessel faster or slower as may be thought necessary, or the holes may be fully opened to permit the contents of the vessel to cool. Also water can be poured through said holes without exposing the hand to the steam rising from the whole of the interior of the vessel, and likewise water can readily be poured off from the vessel, the water flowing between the main cover and the disk. The condition of the contents can readily be tested by inserting a fork through one of the holes. Moreover, with this construction it is impossible for liquid in the vessel to boil over and crack a hot stove because the region above the cover is of much lower temperature than that in the interior of the vessel and when the boiling liquid passes above the cover it is immediately cooled. By unscrewing the lower section from the upper, the device is in four separate parts so that it can be easily cleaned or stored or packed.

I claim:—

In a device of the character described, the combination of a substantially flat circular plate having a central hole, a second substantially flat plate adapted to rest upon the first plate and having a central hole therethrough and a tube secured to said second plate around said latter hole and having a vertical slot therein, open at the upper end, said plates having other holes therethrough adapted to register with each other when one is turned relatively to the other, a stem within said tube, having a pin engaging said slot to turn the second plate with reference to the first plate, and a stirring arm secured to the lower end of said stem.

In testimony whereof I have hereunto set my hand in the presence of two subscribing witnesses.

MARCUS A. WALDEN.

Witnesses:
F. M. WRIGHT,
D. B. RICHARDS.